(12) United States Patent
Kohonen

(10) Patent No.: US 7,698,409 B2
(45) Date of Patent: Apr. 13, 2010

(54) METHOD AND AN APPARATUS FOR EXECUTING TIMED NETWORK OPERATIONS

(75) Inventor: Tomi Kohonen, Tampere (FI)

(73) Assignee: Nokia Corporation, Espoo (FI)

( * ) Notice: Subject to any disclaimer, the term of this patent is extended or adjusted under 35 U.S.C. 154(b) by 626 days.

(21) Appl. No.: 11/645,023

(22) Filed: Dec. 22, 2006

(65) Prior Publication Data

US 2008/0154913 A1    Jun. 26, 2008

(51) Int. Cl.
G06F 15/173 (2006.01)
G06F 17/30 (2006.01)
H04B 1/16 (2006.01)
H04M 1/00 (2006.01)

(52) U.S. Cl. ............ 709/223; 707/10; 455/343.1; 455/574

(58) Field of Classification Search ............ 709/223
See application file for complete search history.

(56) References Cited

U.S. PATENT DOCUMENTS

| | | |
|---|---|---|
| 5,802,305 A | 9/1998 | McKaughan et al. |
| 6,539,231 B1 * | 3/2003 | Hamilton et al. ......... 455/456.1 |
| 2003/0084161 A1 * | 5/2003 | Watson et al. ............... 709/227 |
| 2006/0187866 A1 * | 8/2006 | Werb et al. .................. 370/311 |
| 2007/0077960 A1 * | 4/2007 | Jain et al. ................. 455/550.1 |
| 2008/0045277 A1 * | 2/2008 | Plestid et al. ............... 455/574 |

FOREIGN PATENT DOCUMENTS

| | | |
|---|---|---|
| EP | 0835008 | 4/1998 |
| EP | 1578095 | 9/2005 |
| WO | WO 97/45786 | * 12/1997 |
| WO | WO 02/065746 | 8/2002 |

* cited by examiner

*Primary Examiner*—George C Neurauter, Jr.
*Assistant Examiner*—Kishin G Belani
(74) *Attorney, Agent, or Firm*—Alfred A. Fressola; Ware, Fressola, Van der Sluys & Adolphson LLP

(57) ABSTRACT

An arrangement and a method comprising maintaining knowledge of a number of current network connections that require performing a periodic network operation (204, 206, 208, 210), with one or more predetermined timing sequences, targeted to at least one remote entity for maintaining the connections, and adjusting the time of execution of at least two such network operations to regularly substantially coincide (212).

21 Claims, 4 Drawing Sheets

METHOD AND AN APPARATUS FOR EXECUTING TIMED NETWORK OPERATIONS

FIELD OF THE INVENTION

The invention generally concerns communication over communication networks. Especially the invention concerns temporal adjustment of network operations execution.

BACKGROUND OF THE INVENTION

FIG. 1 depicts an example of a communication system, or an aggregate of multiple communication systems, that interconnects both mobile and computer networks. In the scenario of the figure, a mobile terminal 102 is communicating with a second terminal such as another mobile terminal or a desktop computer 112 reachable via radio access network 104, core (mobile) network 106, a public computer network 108 such as the Internet, and a local area network 110. Alternatively, either of the terminals 102, 112 may communicate with one or more network elements residing in one of the intermediate networks 104, 106, 108, and 110, for example. The figure is merely used to highlight the fact how far-situated two or more communicating parties having access to different networks may actually reside and how different information transfer technologies may be cleverly combined to provide nearly transparent communication experience. As transfer resources, being either wireless (frequencies, etc) or wired (time slots over a copper pair, etc), are in many cases designed for a certain average load only and the number of connections is generally increasing, the unnecessary or "idle" connections between two or more entities shall not be kept alive for unlimited period of time.

Terminal devices and various network elements may be required to execute a plurality of cyclic operations that are to be performed at least once per a predetermined time interval (e.g. once every N seconds or minutes). For example, let us refer to a scenario in which NAT (Network Address Translation) and/or firewall bindings refreshment is required. NAT functionality offers address mapping between two different networks (e.g. a private and a public one) whereas the firewalls monitor and limit traffic on the edge of a network. In practice, NAT and firewall functions may be implemented by the same apparatus, e.g. the GGSN (Gateway GPRS Support Node) of FIG. 1. One operation needed in this context utilizes a so-called keep-alive time, which refers to a time period X prior to or upon the expiration of which the terminal should send a keep-alive message to the NAT/firewall entity concerning each UDP (User Datagram Protocol) and TCP (Transmission Control Protocol) connection thereof, then the associated, connection-specific timer is reset and the same cycle repeats until the connection is finally terminated. For UDP this X may be something like 30 seconds, and for TCP somewhere around 1200 seconds, for example.

As the keep-alive operations are sent separately for each connection, there often are several keep-alive sequences simultaneously running. Particularly in the case of mobile apparatuses that most likely rely on somewhat limited power sources such as a rechargeable battery, constant wake up procedures from a sleep (or other power saving) state for executing each keep alive operation consume an unnecessary amount of power. For example, from idle operation mode (e.g. when there is no call or other payload data transfer ongoing) the wake up procedure causes a power consumption peak that may last for a relatively long time. In the worst case the connection-specific keep-alive transmissions may prevent the mobile apparatus from never really entering a true sleep state, and the apparatus constantly stays in some power inefficient mode instead.

SUMMARY OF THE INVENTION

In one aspect of the invention, an electronic apparatus comprises:
- a transmitter for transmitting data to at least one remote entity over a communication network,
- a receiver for receiving data from said at least one remote entity over said communication network, and
- a scheduler entity configured to maintain knowledge of a number of current network connections that require performing a periodic network operation, with one or more predetermined timing sequences, targeted to said at least one remote entity for maintaining the connections, and to adjust the time of execution of at least two such network operations to regularly substantially coincide.

Examples of how the timing of network operations with the same timing sequence, e.g. a cycle length or a 'keep-alive time' within which a periodic keep-alive operation shall be performed since the previous one, or different timing sequences may be adjusted to regularly, i.e. either for each instance of one or more network operations executed or for at least every nth instance, coincide is found in the detailed description.

In another aspect, a method for adjusting the time of execution of network operations comprises:
- obtaining information about a number of network connections that require performing a periodic network operation, with one or more predetermined timing sequences, targeted to at least one remote entity for maintaining the connections,
- storing said information,
- adjusting the time of execution for at least two such network operations to regularly substantially coincide, and
- performing said at least two network operations according to the adjusted timing.

In a further aspect, a computer program product comprising code stored on a readable medium, the code when run on a computer, adapted to:
- obtain information about a number of network connections that require performing a periodic network operation, with one or more predetermined timing sequences, targeted to at least one remote entity for maintaining the connections,
- store said information, and
- adjust the time of execution for at least two such network operations to regularly substantially coincide.

Yet, the computer program product may be provided over a communication network or on a computer-readable medium such as an optical disc (e.g. a cd-rom), a memory card, a floppy disk, and a magnetic disc.

The term "substantially" refers to parallel activity, e.g. transmitting two keep-alive messages simultaneously, or serial activity with small or no delay between the operations so that the executing apparatus will not initiate e.g. a sleep mode between the keep-alive messages. Serial activity may be implemented by sending e.g. two or more keep-alive notifications in one message, or two or more separate messages temporally close to each other; the issue will be reviewed hereinafter in more detail.

The term "connection" may refer to a physical or a logical one.

The invention enables the executing apparatus to stay longer in a power-saving mode like a sleep mode, which, for its part, maximises operating time in general including e.g. standby and call times.

In an embodiment of the invention a terminal apparatus includes a scheduler entity that takes care of the timing of keep-alive operations for each registered client (application) thereof.

BRIEF DESCRIPTION OF THE ATTACHED DRAWINGS

Below, various embodiments of the invention are described in more detail with reference to the attached drawings in which FIG. 1 discloses an example of a communication system wherein the arrangement of the invention can be utilized.

DETAILED DESCRIPTION OF THE EMBODIMENTS

Figure 1:
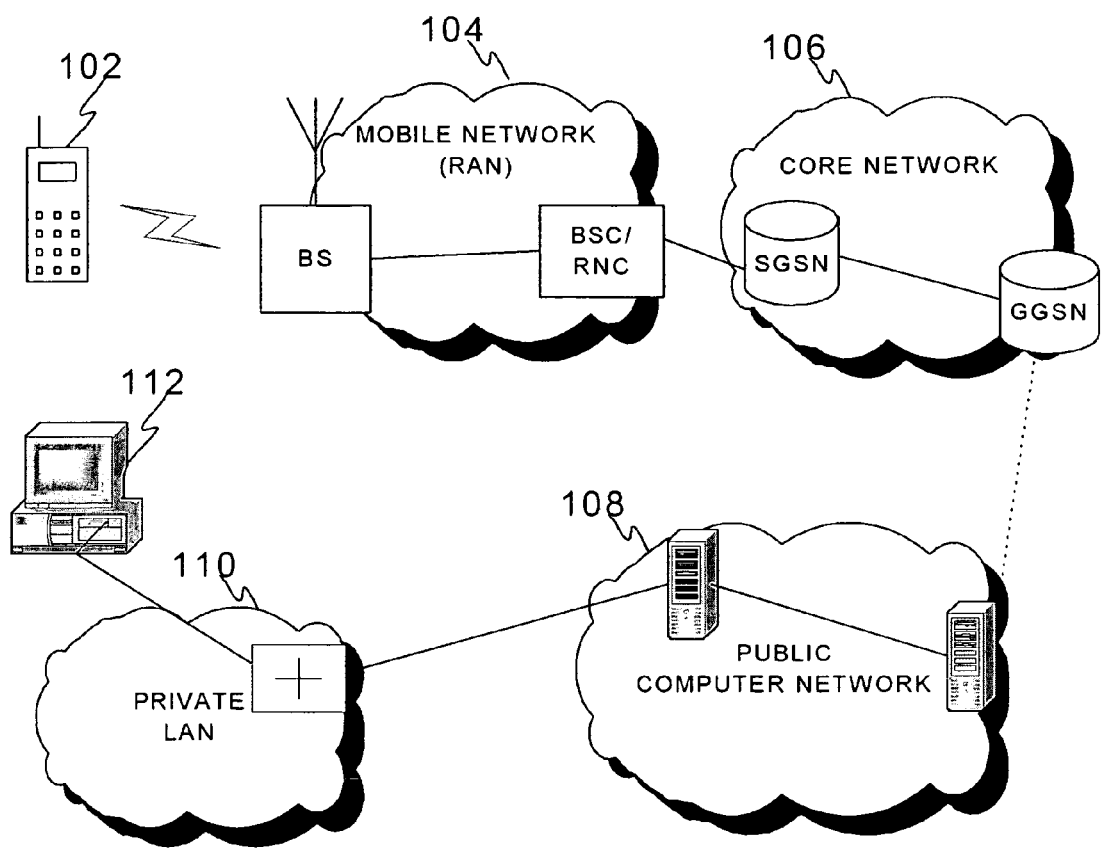

FIG. 1 was already reviewed hereinbefore.

Figure 2:
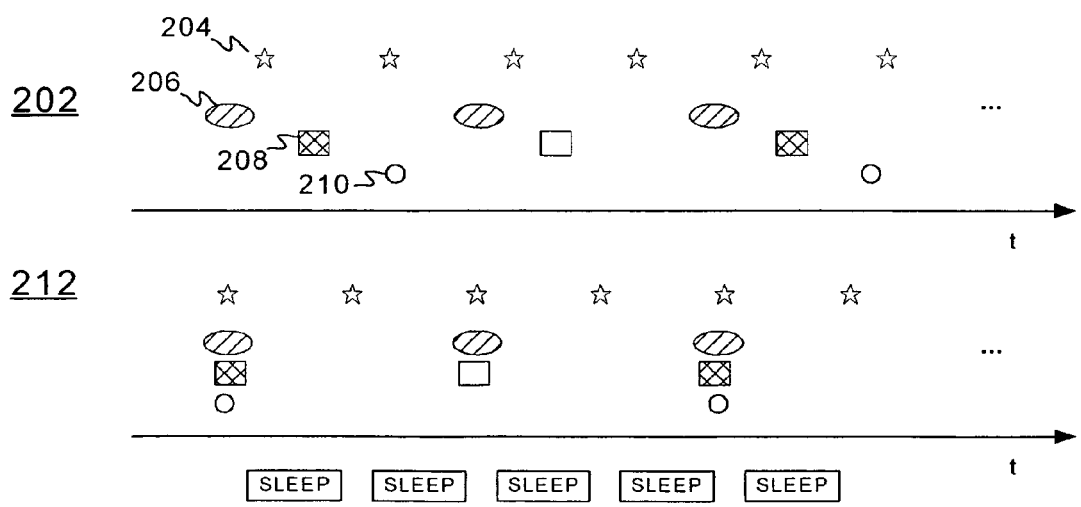
FIG. 2 depicts an activity chart of network operations prior to and after an adjustment procedure according to an embodiment of the invention.

FIG. 2 discloses one example of the effect of the inventive arrangement that takes place in a terminal apparatus required to perform multiple network operations in order to keep the related network connections alive. Hereinafter such network operations for maintaining a connection are also referred to as keep-alive operations due to their nature. Prior to introduction of the procedure of one embodiment of the invention to the current scenario 202, a total of four keep-alive operation chains, or 'timeliness', 204, 206, 208, and 210 are simultaneously running and causing a situation, wherein the executing apparatus cannot in practice enter the power-saving mode at all. E.g. different client applications of the executing apparatus may perform the keep-alive operations independently of each other, which makes the overall timing thereof more or less random.

Keep-alive operations for maintaining the associated connections may involve data transmission, which requires ramping-up amplifier(s) in the transmitter and executing other time and power-consuming activities. Keep-alive operation chain 204 has the highest frequency, i.e. the shortest cycle, which means that the associated operations have to be executed most frequently in contrast to the remaining chains. Keep-alive operation chains 206 and 208 have a common, slightly lower frequency/longer cycle, whereas the reference numeral 210 denotes a chain requiring performing keep-alive operations most seldom (half the frequency of chains 206, 208).

The scheduler obtains knowledge of the current, either established or to-be-established, connections and required timing sequences, e.g. keep-alive times. Next to reference numeral 212 one option for optimizing the timing of keep-alive operations is presented. Now the operation chains of all four connections are synchronized so that during every second keep-alive operation instance three 204, 206, 208 or four 204, 206, 208, 210 keep-alive operations are performed whereas the remaining instances solely related to the keep-alive chain 204 requiring most frequent attention. Keep-alive operations relating to the keep-alive chain 210 having the longest cycle ('keep-alive time') are performed during every fourth keep-alive operation instance only.

As a result, periods marked with "SLEEP" rectangle are created to enable the executing apparatus to properly enter a power-saving mode without a need to perform keep-alive operations all the time and thus keep e.g. the amplifiers of the transmitter in power-consuming, active mode.

Figure 3:
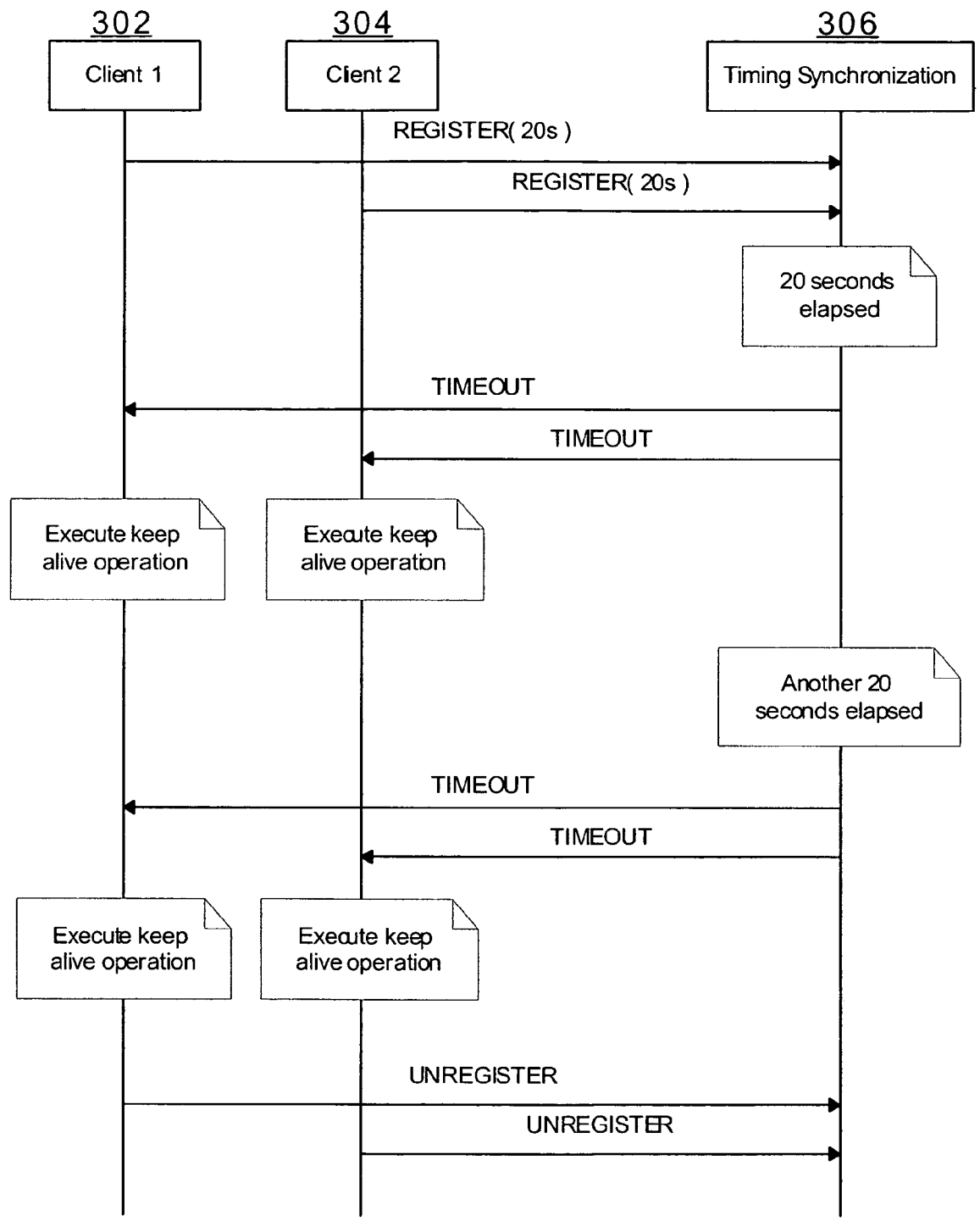
FIG. 3 illustrates signalling taking place in an apparatus between clients and the scheduler entity in the apparatus implementing an embodiment of the invention

FIG. 3 discloses an example of signalling taking place between clients 302, 304 (e.g. UDP sockets or VoIP (Voice Over IP)-related entities) taking care of each connection/ related keep-alive operations and the scheduler entity 306, e.g. a software module such as an application, adjusting the timing of the keep-alive operations in accordance with an embodiment of the current invention.

Each client 302, 304 applying the scheduler 306 may first register therewith by sending e.g. a message including the required timing sequence (e.g. keep-alive time or period length) and possible timing constraints (e.g. timing accuracy and/or timing randomization requirements). As an alternative to explicit message transfer, the registration and/or triggering of network operations may be handled through function-based solutions (callback etc) in the context of the invention.

The timing sequence may in basic form thus refer to a cycle time, e.g. 20 seconds shown in the figure, which defines the maximum duration between two subsequent keep-alive operations so that the connection is still maintained. However, more complex timing sequences may also be utilized in the context of the invention; keep-alive operations may be performed according to some mathematic formula or other predetermined rules. For example, every third keep-alive transmission may be performed within extended, e.g. a double, keep-alive time in contrast to the basic keep-alive cycle.

Nevertheless, the scheduler 306 may inform each client about a synchronized timing instant for performing a keep-alive operation by sending a notification message ('TIMEOUT'). The scheduler 306 finds out suitable operation timings by analyzing the timing needs that the registered clients have indicated. Implementing the timing of operations that require similar kind of timing, e.g. same cycle length without further modifiers, requires just a single timer.

Figure 4:
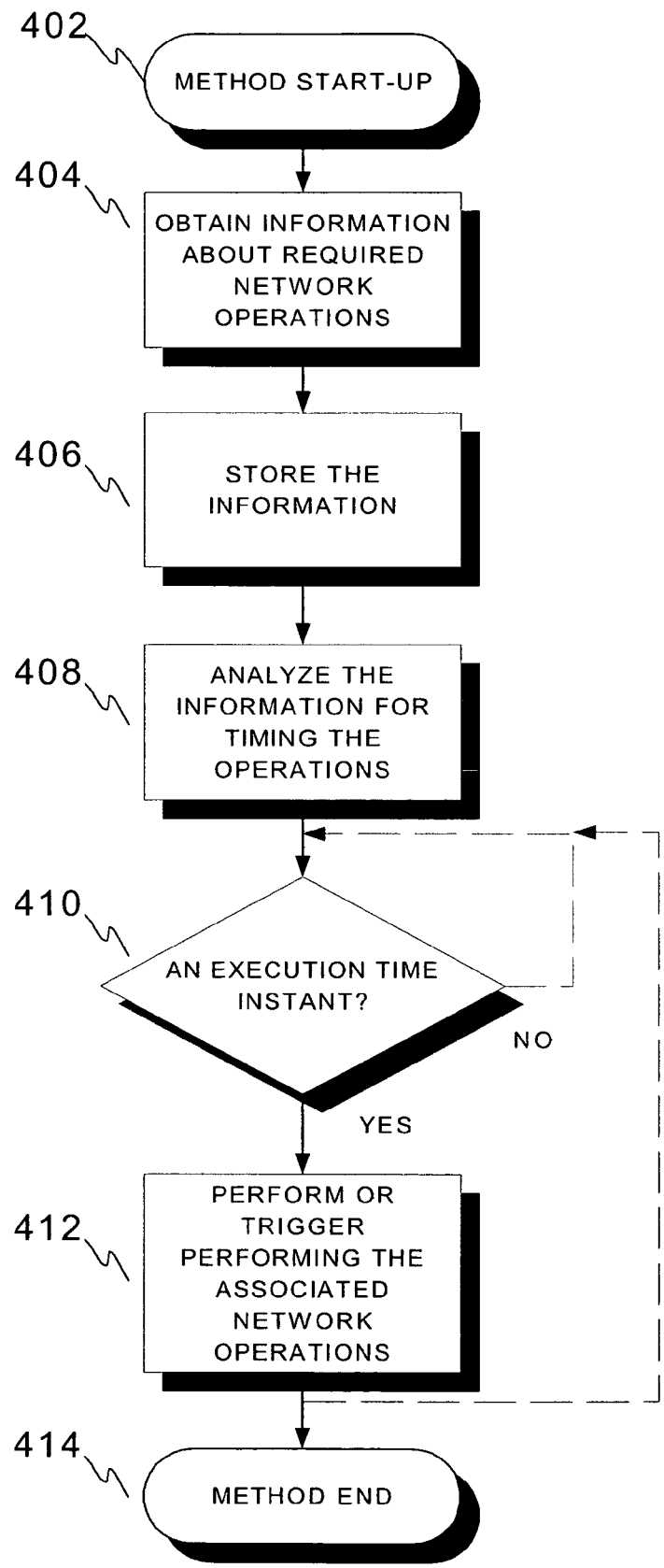
FIG. 4 is a flow diagram representing an embodiment of the method according to the invention.

FIG. 4 discloses a flow diagram of one option for carrying out the method according to the invention. During a method start-up 402, the scheduler is launched and the client applications may, for example, inform the scheduler about their timing needs for performing network operations. In step 404 the scheduler obtains the necessary information (timing sequences including at least the keep-alive cycle, optional constraints) from the clients by receiving related messages or by accessing, on its own initiative, e.g. memory locations of the client application disclosing such information. The scheduler may also advertise the scheduling service and poll the clients to get assignments and necessary information for adjusting and keeping track of the network operations timing, for example. In step 406 the obtained information is stored as such, in part, or in a modified form. In step 408 the scheduler adapts and adjusts the timing of the required network operations relating to a number of network connections so as to coincide, if possible. The scheduler may maintain an information database that comprises the data received from clients and arrange the data into a single schedule with optimized, i.e. merged, network operation time instants commonly used by the clients. Such process may utilize e.g. tables (e.g. different cycle lengths and how to fit these together for a single time-line) and/or formulas for timing optimization. Operations with similar timing requirements (same cycle length etc) may be straightforwardly tied together, i.e. they will be always performed substantially simultaneously. Operations with different cycle length, e.g. 3 and 4 seconds, may be performed as often as possible substantially simultaneously, which in the current example means once per 12 seconds. Thus these operations are regularly performed substantially simultaneously, but not all the time or during every possible network operation instance. Therefore, finding a common multiple between different cycle times and delaying or advancing the different network operation chains to start rolling simultaneously is one way to look at the issue. If the sequences and/or cycle times are very different, it may still happen that common instants for performing the associated network operations are very seldom. Anyway, one aspect of the invention is that despite of the timing adjustments, each network operation shall be executed in time, e.g. prior to the expiry of the related keep-alive time. Preferably also redundant operations, e.g. multiple similar keep-alive operations within a single cycle/keep-alive time, shall be avoided.

Another solution to the exemplary scenario with 3 and 4 seconds cycle lengths is to execute both the network operations once per every shorter cycle length of 3 seconds, which in a general case indicates performing at least two network operations according to the shortest original cycle length thereof. Consequently the network operation with 4 seconds cycle is executed a bit more often than necessary, but the executing apparatus may still stay longer in a continuous sleep state. The selection between the above two solutions has to be assessed by evaluating e.g. the power consumption gain arising from the more seldom switching between operational states (e.g. sleep and active) against the power consumption increase due to additional transmissions or extended transmission periods.

Whenever the scheduler itself takes care of performing the operations, it may execute them in parallel or serially with minimized temporal difference. In case the scheduler only instructs other entities what comes to the timing of the operations, please revert back to the clients 302, 304 of FIG. 3, it may either externally trigger the operations by sending a message (e.g. TIMEOUT in FIG. 3) or proactively instruct the clients with a time schedule, etc how to proceed with timing in the future. The scheduler may also be used to control the timing of network operations executed by an external device; in that case the device to be controlled and the apparatus comprising the scheduler communicate via a compatible data interface, a wired or a wireless one, through which the scheduler transmits timing information and receives timing assignments/requests, for example.

In step 410 it is checked, either by the scheduler itself in the case it is in real-time fashion controlling the clients or even performing the operations, or by the clients who have received instructions from the scheduler how to deal with the timing, whether a scheduled instant for performing network operation(s) for one or more connection has taken place; if that is the case 412, the associated network operations such as keep-alive message transmissions are performed preferably simultaneously, although fully simultaneous execution is not practically feasible in many scenarios wherein e.g. a single transmission means serve all client applications of an apparatus or the clients receiving the triggering commands are not mutually synchronized anyhow. In those cases the operations are taken with minimized temporal separation offered e.g. by a transmission/task queue functions. Meanwhile, the scheduler may obtain updated/new information from the clients for further adapting and adjusting a common schedule for performing network operations of various connections. The remote entity that is the target of network operations may at least occasionally acknowledge the detected keep-alive operations and transmit (updated) requirements (keep-alive time, constraints) to the apparatus, either targeted directly to the scheduler or to the client(s) that later forward at least part of them to the scheduler. The method execution is ended in step 414, when the scheduler functionality is disabled in the executing apparatus, for example. Otherwise, the scheduling operation 410, 412 may be continued in a loop-fashion as depicted by the dotted line in the figure.

The scheduler entity of the invention may not have to be implemented as a separate apparatus or a separate application from other apparatuses/applications; it may also be integrated in an apparatus/application for controlling internal functions (e.g. tasks) that require performing network operations for maintaining related network connections.

Figure 5:
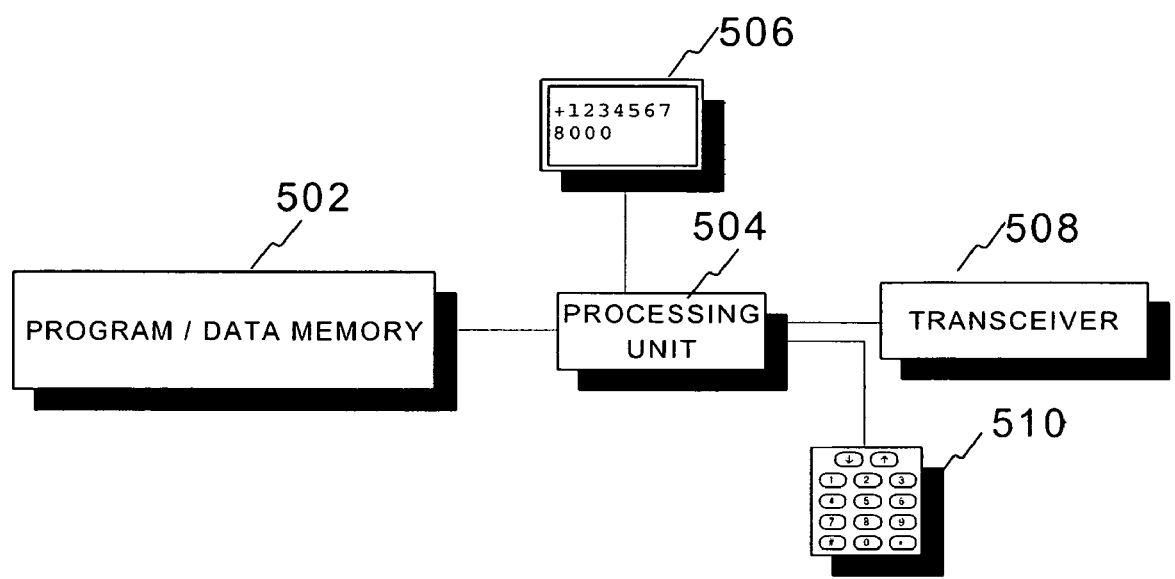
FIG. 5 is a block chart of an apparatus capable of implementing an embodiment of the present invention.

FIG. 5 discloses one example of an apparatus adapted to perform the arrangement of the present invention. The apparatus comprises a processing means for executing instructions and handling data, such as a processing unit 504 or a plurality of functionally connected units in a form of a microprocessor, a microcontroller, a DSP, a programmable logic array, or a combination of those. Further, the apparatus comprises a means for storing information such as instructions and other data. Such means include memory 502 comprising one or more, optionally removable, memory chips and/or a magnetic disc, for example. The scheduler may be dedicated software or a part of a more-generic software running in general hardware, but also tailored hardware may be utilized. User input means 510 such as a keypad, buttons, voice command interface, touch screen, mouse, touch pad, etc are optional but handy means for providing control input by a user of the apparatus. Another part of optional but useful user interface is provided by a display means 506, which may refer to an internal display, a connector for an external monitor, or data projection means (e.g. a projector), for example. For executing network operations and/or communicating with an external device executing those, a transmission means such as a transceiver 508 comprising a transmitter and a receiver is provided. The transmission means may support wireless and/or wired communication; e.g. RF, infrared, or Bluetooth connectivity may be implemented.

The above-described exemplary embodiments of the invention should be construed as an aid for comprehending the applicability of the claims and not as explicit limitations regarding such applicability. For example, the network operations for maintaining the related network connections are not limited to any specific ones, e.g. the ones particularly expressed as 'keep-alive' operations in the literature, as long as the operations follow the general idea disclosed in this text. In addition to terminal apparatuses, the invention may be utilized in other devices such as network elements. Various embodiments disclosed by the dependent claims can also be combined together to form aggregate solutions.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An electronic apparatus comprising
   a transmitter for transmitting data to at least one remote entity over a communication network,
   a receiver for receiving data from said at least one remote entity over said communication network, and
   a scheduler entity configured to maintain knowledge of a number of current network connections that require performing a periodic network operation, with one or more predetermined timing sequences, targeted to said at least one remote entity for maintaining the connections, and to adjust the time of execution of at least two such network operations to regularly substantially coincide.

2. The apparatus of claim 1, arranged to receive at least part of said knowledge from said remote entity via said receiver.

3. The apparatus of claim 1, wherein said scheduler entity is configured to receive said knowledge from one or more client entities managing said number of network connections in the apparatus.

4. The apparatus of claim 1, wherein said scheduler entity is configured to obtain at least part of said knowledge by accessing a predetermined memory location in the apparatus associated with a client entity managing one or more of the network connections in the apparatus.

5. The apparatus of claim 1, wherein said scheduler entity is configured to trigger a number of client entities to perform the network operations according to the adjusted timing.

6. The apparatus of claim 1, wherein said scheduler entity is arranged to perform at least part of the network operations by said transmitter according to the adjusted timing.

7. The apparatus of claim 1, wherein said scheduler is arranged to provide instructions to a number of clients about proper timing of the network operations as adjusted.

8. The apparatus of claim 1, wherein a timing sequence defines a keep-alive time within which a periodic network operation shall be performed since the previous network operation for maintaining a network connection.

9. The apparatus of claim 1, wherein a timing sequence includes a set of rules defining the interrelations between sequential network operations for maintaining a network connection.

10. The apparatus of claim 1, wherein a timing sequence includes a mathematic formula defining the interrelations between sequential network operations for maintaining a network connection.

11. The apparatus of claim 1, wherein a periodic network operation includes sending a keep-alive message to said at least one remote entity.

12. The apparatus of claim 1, configured to instruct an external entity to time said periodic network operations.

13. An apparatus comprising
    means for transmitting data to at least one remote entity over a communication network,
    means for receiving data from said at least one remote entity over said communication network, and
    means for maintaining knowledge of a number of current network connections that require performing a periodic network operation, with one or more predetermined timing sequences, targeted to said at least one remote entity for maintaining the connections, and for adjusting the time of execution of at least two such network operations to regularly substantially coincide.

14. A method for adjusting the time of execution of network operations comprising:
    obtaining information about a number of network connections that require performing a periodic network operation, with one or more predetermined timing sequences, targeted to at least one remote entity for maintaining the connections,
    storing said information,
    adjusting the time of execution for at least two such network operations to regularly substantially coincide, and
    performing said at least two network operations according to the adjusted timing.

15. The method of claim 14, wherein said obtaining includes receiving said knowledge from one or more client entities managing said number network connections in the apparatus.

16. The method of claim 14, wherein a timing sequence includes a keep-alive time within which a periodic network operation shall be performed since the previous network operation for maintaining a network connection.

17. The method of claim 14, comprising sending, according to the adjusted timing, a triggering command to a client entity for performing the network operation in order to maintain the associated connection.

18. An apparatus comprising:
    a processor,
    a memory including computer program code,
        the memory and the computer program code configured to, with the processor, cause the apparatus at least to perform:
        obtaining information about a number of network connections that require performing a periodic network operation, with one or more predetermined timing sequences, targeted to at least one remote entity for maintaining the connections,
        storing said information, and
        adjusting the time of execution for at least two such network operations to regularly substantially coincide.

19. The apparatus of claim 18, further configured to obtain said information in a message received from a local client entity or said at least one remote entity.

20. The apparatus of claim 18, further configured to trigger the execution of the number of network operations.

21. The apparatus of claim 18, further configured to adjust said time on the basis of a keep-alive time included in the obtained and stored information, said keep-alive time defining a time interval within which a periodic network operation shall be performed since the previous network operation for maintaining a certain network connection.

* * * * *